US008881286B2

(12) United States Patent
Yu (10) Patent No.: US 8,881,286 B2
(45) Date of Patent: Nov. 4, 2014

(54) CLUSTERING PROCESSING METHOD AND DEVICE FOR VIRUS FILES (75) Inventor: Tao Yu, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/125,042

(22) PCT Filed: Jul. 3, 2012

(86) PCT No.: PCT/CN2012/078104
§ 371 (c)(1),
(2), (4) Date: Dec. 9, 2013

(87) PCT Pub. No.: WO2013/020426
PCT Pub. Date: Feb. 14, 2013

(65) Prior Publication Data
US 2014/0150105 A1 May 29, 2014

(30) Foreign Application Priority Data
Aug. 9, 2011 (CN) .......................... 2011 1 0226879

(51) Int. Cl.
*G06F 21/56* (2013.01)
(52) U.S. Cl.
CPC ............ *G06F 21/561* (2013.01); *G06F 21/562* (2013.01)
USPC .................... 726/24; 726/22; 726/23; 726/25; 713/151; 713/152; 713/188
(58) Field of Classification Search
CPC ..... G06F 21/562; G06F 21/56; G06F 21/561; G06F 21/55
USPC .................... 726/1, 22–29; 713/150–153, 188
See application file for complete search history.

(56) References Cited

U.S. PATENT DOCUMENTS

2008/0066179 A1* 3/2008 Liu .................................. 726/24
(Continued)

FOREIGN PATENT DOCUMENTS

CN 101604363 A 7/2009
CN 101604365 A 7/2009

OTHER PUBLICATIONS

Written Opinion of the International Searching Authority dated Nov. 1, 2012, pp. 1-4, International Application No. PCT/CN2012/078104, The State Intellectual Property Office, the P.R. China. (English Translation thereof).

(Continued)

*Primary Examiner* — Venkat Perungavoor
*Assistant Examiner* — Amir Mehrmanesh
(74) *Attorney, Agent, or Firm* — Brinks Gilson & Lione (57) ABSTRACT A method and device for clustering virus files is provided. The method involves statically analyzing binary data of virus files to be clustered, so as to obtain PE structure data of the virus files. Further, based on a comparison of the PE structure data, those virus files with PE structure data meeting a specific similarity may be categorized into the same category. The device may include a first data analyzing module configured to extract PE structure data of virus files to be clustered by static analysis of binary data of the virus files. A first clustering module of the device may compare the PE structure data and cluster the virus files having the PE structure data meeting a specific similarity into the same category. The solution may improve efficiency of clustering computer virus files, reduce resource consumption, and avoid the risk of virus infection caused by dynamically running the virus files.

10 Claims, 4 Drawing Sheets

(56) References Cited

U.S. PATENT DOCUMENTS

| | | | |
|---|---|---|---|
| 2008/0115219 A1* | 5/2008 | Kim et al. | 726/25 |
| 2011/0167474 A1* | 7/2011 | Sinha et al. | 726/1 |
| 2012/0079596 A1* | 3/2012 | Thomas et al. | 726/24 |
| 2012/0159625 A1* | 6/2012 | Jeong et al. | 726/23 |

OTHER PUBLICATIONS

Rui Jing, "Research and implementation of Malicious Code Detection System", Master Dissertation, University of Electronic Science and Technology of China, Apr. 15, 2011.

* cited by examiner

CLUSTERING PROCESSING METHOD AND DEVICE FOR VIRUS FILES

TECHNICAL FIELD

The present disclosure relates to the field of computer data processing, and particularly to a cluster classification method for performing cluster classification on computer virus files and a device thereof.

BACKGROUND

Computer viruses may generally have family characteristics, and one certain computer virus may evolve into a variant virus. A variation of a virus may be targeted for an anti-antivirus process in some antivirus software. Generally, such a virus and viruses derived from it may have family characteristics. Anti-virus software may classify virus families according to the family characteristics of the viruses, in which a common feature shared by all viruses of the family is extracted as a criterion for virus determination, allowing identifying all of the viruses in the family by only one record in the virus library. It can be seen that an accurate clustering of virus families may substantially enhance efficiency of the antivirus software and to identify and purge viruses, and further, reduce the size of the virus library.

An existing cluster classification of viruses may be performed manually in which virus files are dynamically run and dynamic behavior features of the viruses are manually recorded and analyzed. Behavior features of the viruses may include modification to a system sequence for calling application programming interfaces (APIs) of the system, registry and creation of a file at a sensitive position. Manual cluster classification may be performed by accounting such dynamic behavior features.

Disadvantages of performing cluster classification of viruses manually may include the following. Substantial human resources involving virus analysis may be needed. Further, virus analysts, typically, should be very experienced. Cluster classification of viruses may demand dynamically running or executing the virus files to observe the dynamic behavior features of the virus files. This may not only increase consumption of time and computer resources, but also may increase risks of virus infection in the local computer during dynamic execution of the virus files.

SUMMARY OF THE DISCLOSURE

The embodiments described in the present disclosure may provide a method and a device for cluster classifying virus files, so as to enhance the efficiency for the cluster classification of computer virus files, reduce resource consumption, and avoid the risk of virus infection caused by dynamic execution of the virus files.

The present disclosure provides at least the following technical solutions.

In a first aspect, a method for cluster classifying virus files, may involve statically analyzing binary data of virus files which need to be classified to obtain portable executable (PE) structure data of the virus files; and comparing the PE structure data of the virus files which need to be classified and classifying virus files which have PE structure data meeting a specified similarity condition into a same category.

In a second aspect, a device for cluster classifying virus files, may include a first data analyzing module, configured to statically analyze binary data of the virus files which need to be classified to extract PE structure data of the virus files; and a first cluster classification module, configured to compare the PE structure data of the virus files which need to be classified, and to classify virus files which have PE structure data meeting a specified similarity condition into a same category.

Compared with the manual classification in the prior art, the process according to the present disclosure may be performed automatically by a computer to analyze binary data of the virus files and perform the cluster classification based on the binary data. Thus, the efficiency of the cluster classification of computer virus files may be improved, and the resource consumption, including the consumption for human resources, time resources, computer resources and so on, may be reduced.

Compared with the mode in which the cluster classification is performed by dynamic execution of the virus files in the prior art, in the present disclosure a static analysis is utilized to compare the binary portable executable (PE) structure data of the virus files or further perform blocked hash comparison on section data, and then the virus files having a specified similarity are classified into the same category. Hence, the dangers of virus infection caused by the dynamic execution of the virus files may be avoided.

BRIEF DESCRIPTION OF THE DRAWINGS

To illustrate the technical solutions of the embodiments of the present disclosure more clearly, the drawings to be used in the description of the embodiments will be simply introduced below. Obviously, the drawings described in the following are just illustration of some embodiments of the present disclosure, and other drawings may be obtained by those skilled in the art in light of these drawings without any creative labor.

DETAILED DESCRIPTION OF THE DISCLOSURE

In the following, the technical solutions of the embodiments of the present invent will be clearly and completely described in combination with the drawings. Obviously, the described embodiments are just some of the embodiments of the present disclosure, but not all of the embodiments. Any other embodiments obtained by those skilled in the art based on the embodiments of the present disclosure without any creative labor fall within the scope of protection of the present disclosure.

Next, the present disclosure will be further illustrated in details in combination with the drawings and specific embodiments.

A virus file, which may be expressed in a form of binary data, may be a type of computer file. In the present disclosure, it is proposed that, by analyzing features of the binary data of the virus file and features of a virus family characteristics, a method for cluster classifying virus files may be performed automatically by a computer and/or by a device for cluster classifying virus files.

Figure 1:
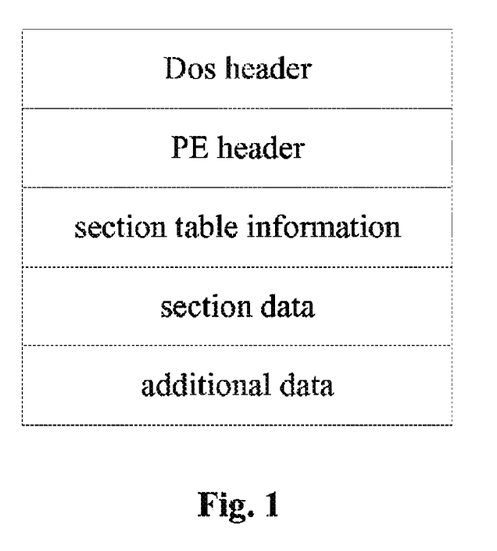
FIG. 1 is an example schematic structure of a PE file.

In WINDOWS operating system, for example the virus file may generally a portable executable (PE) file. FIG. 1 is a schematic structural diagram of a PE file. Referring to FIG. 1, the PE file generally may include a DOS header, a PE header, a section table information, a section data and additional data. The DOS header, the PE header and the section table information may be included in the PE structure for identifying structural features of the PE file. The virus file which may have a function of anti-antivirus, may feature modifications made in some portions of the section data in the PE file. Virus files of this type may often have same or similar PE structure data. Therefore, according to the present disclosure, the cluster classification of the virus files may be performed according to the PE structure data of the virus files.

Figure 2:
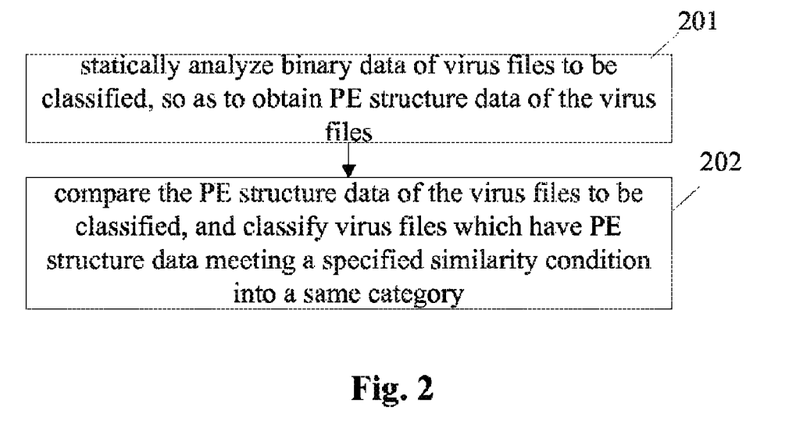
FIG. 2 is a flow chart of an example method for cluster classifying virus files according to the present disclosure.

FIG. 2 is a flow chart of an example method for cluster classifying virus files according to the present disclosure. Referring to FIG. 2, the process may include step 201 of statically analyzing binary data of virus files which are to be classified to obtain the PE structure data of each one of the virus files; and step 202 of comparing the PE structure data of the virus files which are to be classified, and classifying virus files which have PE structure data meeting a specified similarity condition into a same category.

The similarity condition, or similarity, may indicate the degree of analogy between data of two compared objects. For example, the similarity may be represented by a percentage representing an amount of the data that is substantially the same or identical among the two compared objects from the total amount of the data; the similarity may also be represented by a ratio of consecutive bytes that are the same for the two compared objects; and after performing block-division processing on the two compared objects, the similarity may also be represented by a number of the data blocks that are the same for the two compared objects, or by a number of consecutive data blocks that are the same for the two compared objects.

In the present disclosure, the PE structure data used for comparison may be any one of the DOS header, the PE header or the section table information or any combination thereof One implementation of the step 202 may include the following steps, from step 221 to step 223. Step 221, may involve setting a first virus file as a central file of a new category.

Step 222, may involve comparing a PE structure data of a next virus file with the PE structure data of the central files of respective categories in sequence. If there is only one category, the PE structure data of the next virus file may be compared with the central file of the only one category. If the PE structure data of the next virus file has the specified similarity with the PE structure data of the central file of one category, for example, if the percentage that the number of the same bytes, obtained by analyzing the bytes of the PE structure data, exceeds a threshold, which may mean meeting of the specified similarity, the next virus file may be classified into the one category and step 223 may be performed. Alternatively, or if the ratio of the same consecutive types in the PE structure data exceeds a threshold, which may mean meeting of the specified similarity, the next virus file may be classified into the one category and performing step 223 may be performed. In yet another example if the PE structure data of the next virus file does not have the specified similarity with the PE structure data of the central file of the one category, or of any of the other categories, the next virus file may be set as the central file of a new category and performing step 223 may be performed.

Step 223 may involve determining whether there is an additional next virus file. If there is a next virus file, then the step 222 may be repeated; otherwise, the process may be ended.

For example, assuming that there are N virus files which need to be classified, a first virus file may be firstly set as the central file of a new category. A second virus file may be compared with the first virus file. If the PE structure data of the second virus file has the specified similarity with that of the first virus file, then the second virus file may be classified into the same category as the first virus file, otherwise the second virus file may be set as the central file of a new category. Here, assuming that the similarity between the PE structure data of the first virus and the PE structure data of the second virus file does not meet the specified similarity and the second virus file is set as the central file of a new category, a third virus file may be compared with the first virus file and the second virus file in sequence, and may be classified into the corresponding category of the virus file of which the PE structure data has the specified similarity with the PE structure data of the third virus file.

If the similarity between the PE structure data of the second virus file and the PE structure data of the first virus file meets the specified similarity, the second virus file may be classified into the same category as the first virus file. Thereafter, the third virus file may be compared with the central file of the category, i.e., the first virus file, but not be compared with other virus files (such as the second virus file) in the category.

The subsequent virus files may be processed in the same manner, until the processing for all of the N virus files is completed.

In the processing described above, if the number of the virus files in a category exceeds a specified value, for example, 3, and is smaller than another specified value, for example, 10, the central file of the category may be re-determined. That is, the step 202 may further include: determining whether the number of the virus files in respective categories is within a specified numeric range (for example, greater than or equal to 3 and smaller than 10), and if the number of the virus files in a category is within the specified numeric range, re-determining the central file of the category.

The method for re-determining the central file of the category may include: obtaining similarities between the PE structure data of respective virus files in the category. Further, a sum of similarity may be obtained for each virus file in the category by adding the similarities between the PE structure data of each virus file and the PE structure data of other virus files. Further yet, the virus file having the maximum sum of similarity may be set as the central file of the category.

Through the above processing, the cluster classification may be performed for the virus files. In addition, according to the present disclosure, a secondary cluster classification may be performed for the virus files in each of the categories classified in the above way, to further refine the categories of the virus files and increase the similarity between the virus files in each category.

Figure 3:
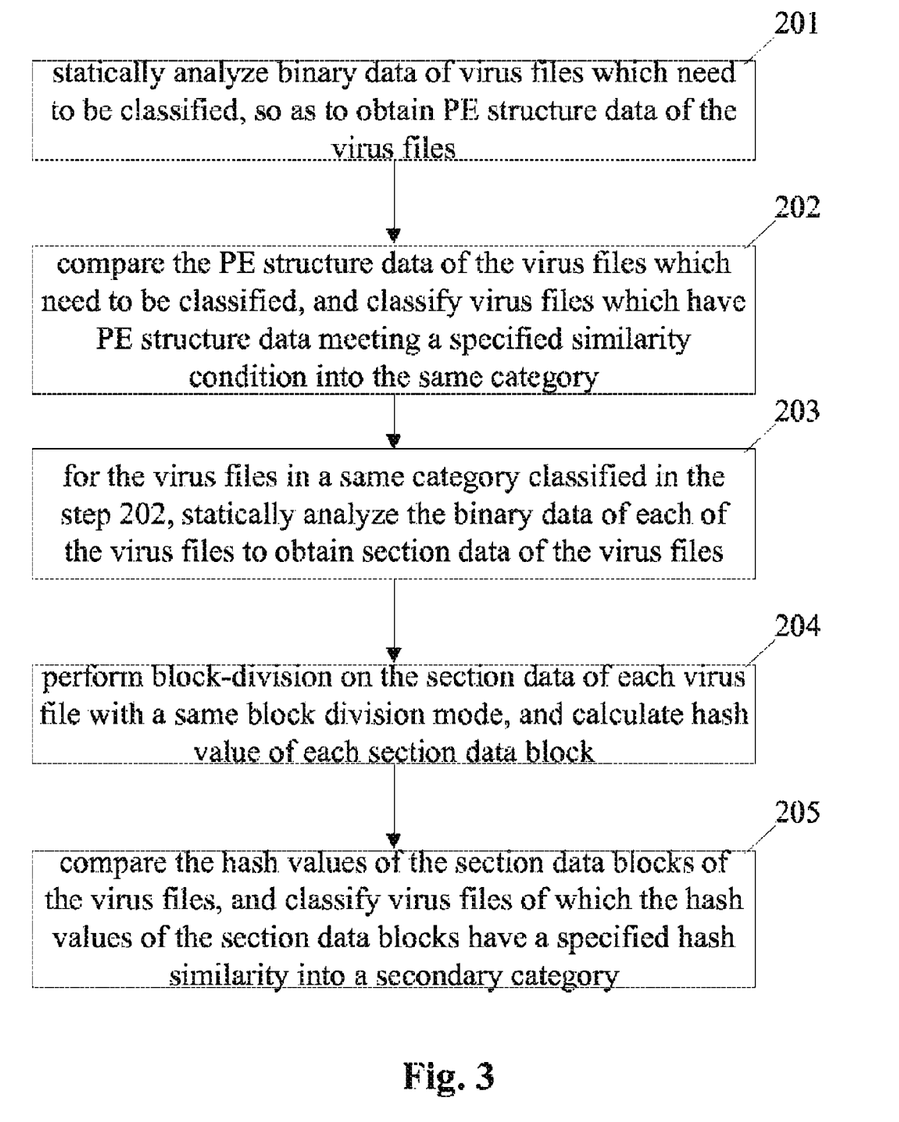
FIG. 3 is a flow chart of an example method for cluster classifying virus files, which includes a secondary cluster classification, according to the present disclosure.
Figure 4:
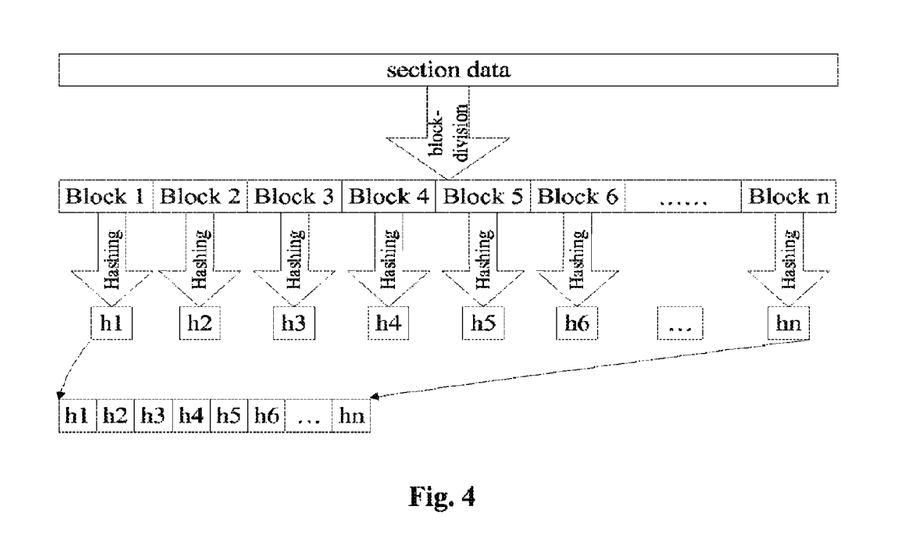
FIG. 4 is a schematic diagram showing an example of a block-division processing and hash calculation made to section data of virus files.

FIG. 3 is a flow chart of an example method for cluster classifying virus files, which may include the secondary cluster classification, according to the present disclosure. FIG. 4 is a schematic diagram showing an example block-division processing and hash calculation performed on the section data of the virus file. Referring to FIG. 3 and FIG. 4, the flow chart of FIG. 3 includes the steps 201 and 202 in FIG. 2, and after the step 202, for the virus files in each of the categories classified in the step 202, the method may further include steps 203 to 205 described below.

Step 203 may involve statically analyzing the virus files in a same category classified in the step 202. Such static analysis of the binary data of each of the virus files may be performed to obtain section data of the virus files.

Step 204 may involve performing block-division on the section data of each virus file with a same block division mode, and calculating hash value of each section data block. For example, in FIG. 4 n section data blocks may be obtained and the corresponding hash values may be h1, h2, h3, . . . , hn, respectively.

Step 205 may involve comparing the hash values of the section data blocks of the virus files, and classifying virus files into a secondary category, according to the hash values of the section data blocks which have a specified hash similarity.

The step 205 may include several intermediary steps described such as 251 to 253 further.

In step 251, a first virus file among the virus files in the category may be set as a central file of a new secondary category.

In step 252, the hash values of the section data blocks of a next virus file may be compared with the hash values of the section data blocks of the central files of respective secondary categories in sequence. If there is only one secondary category, comparison may be performed with the central file of the only one secondary category. If the hash values of the section data blocks of the next virus file have the specified hash similarity with the hash values of the section data blocks of the central file of the secondary category, the next virus file may be classified into this secondary category and step 253 may be performed. If the hash values of the section data blocks of the next virus file do not have the specified hash similarity with the hash values of the section data blocks of the central file of the secondary category, the next virus file may be set as the central file of a new secondary category and step 253 may be performed.

In step 253, if there is an additional next virus file, the step 252 may be repeated; otherwise, the process of step 205 may be ended.

In the processing described above, if a number of the virus files in a secondary category exceeds a specified value, for example, 3, and is smaller than another specified value, for example, 10, the central file of the secondary category may be re-determined. That is, the step 205 may further include determining whether the number of the virus files in respective secondary categories is within a specified numeric range (for example, greater than or equal to 3 and smaller than 10), and if the number of the virus files in a secondary category is within the specified numeric range, re-determining the central file of the secondary category.

The method for re-determining the central file of the secondary category may include obtaining the similarities between the hash values of the section data blocks of respective virus files in secondary category. Further, a sum of hash similarity may be obtained for each virus file by adding the similarities between the hash values of the section data blocks of each virus file and the hash values of the section data blocks of other virus files. The virus file having the maximum sum of hash similarity may be set as the central file of the secondary category.

In the process of performing the secondary cluster classification, the method for determining similarities between the hash values of the section data blocks of the virus files may include following intermediary steps.

Hash values of corresponding section data blocks for two virus files may be compared. For example, as shown in FIG. 4, the values of h1, h2, h3, . . . , hn of the two virus files may be compared to determine the section blocks of the two virus files which have the same hash values. A number of how many section data blocks have the same has value may be identified. If the number of the section data blocks having the same hash value exceeds a specified threshold (for example, 10), it may be determined that the hash values of the section data blocks of the two virus files have the specified hash similarity. Alternatively, it is possible to determine whether the number of the consecutive section data blocks for which the hash values are the same between the two virus files exceeds a specified threshold, and if such number of the consecutive section data blocks exceeds the specified threshold, it may be determined that the similarity between the hash values of the section data blocks for the two virus files meets the specified hash similarity.

Figure 5:
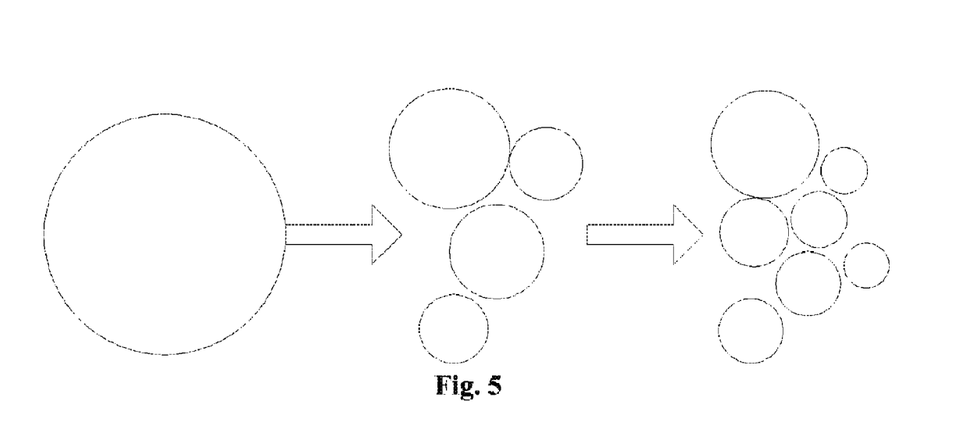
FIG. 5 is a schematic diagram showing the result after an example cluster classification has been performed twice on the virus files.

FIG. 5 is a schematic diagram showing an example result after the cluster classification has been performed twice on the virus files. As shown in FIG. 5, after the secondary cluster classification of the present disclosure, the similarity between virus files in each category may be higher, and the virus files in the same category may be considered as files in the same family.

Figure 6:
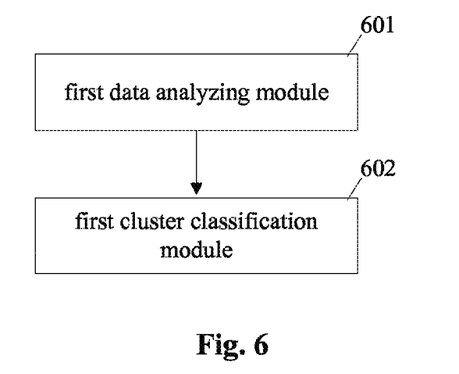
FIG. 6 is a schematic diagram of an example device for cluster classifying virus files according to the present disclosure.

FIG. 6 is a schematic diagram of an example device for cluster classifying virus files according to the present disclosure. Referring to FIG. 6, the device may include a first data analyzing module 601 and a first cluster classification module 602.

The first data analyzing module 601 may be configured to statically analyze binary data of virus files which need to be classified to extract the PE structure data of the virus files.

The first cluster classification module 602 may be configured to compare the PE structure data of the virus files which need to be classified, and to classify the virus files which have the PE structure data meeting a specified similarity condition into a same category.

Figure 7:
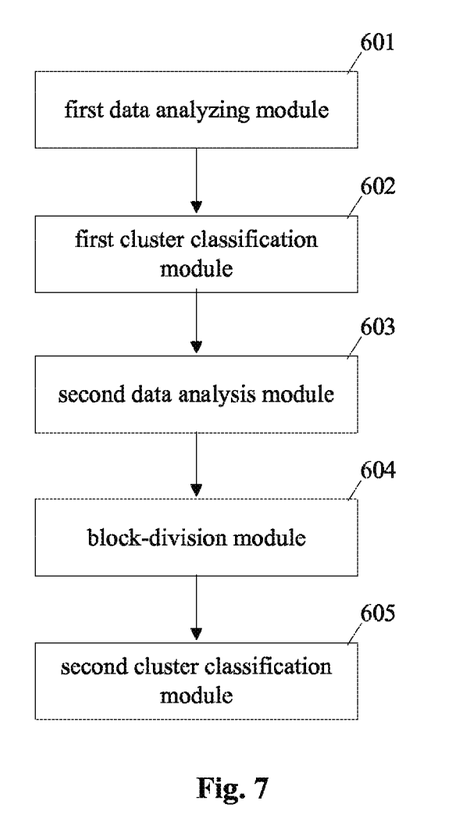
FIG. 7 is a schematic diagram of an example device for cluster classifying virus files, which includes a secondary cluster classification function, according to the present disclosure.

FIG. 7 is a schematic diagram of an example device for cluster classifying virus files, which may include secondary cluster classification function, according to the present disclosure. Referring to FIG. 7, in addition to the modules shown in FIG. 6, the device may further include a second data analysis module 603, a block division module 604, and a second cluster classification module 605.

The second data analysis module 603 may be configured to statically analyze the binary data of each of the virus files to obtain section data of the virus files; and The block-division module 604 may be configured to perform block-division on the section data of each virus file with a same block division mode, and to calculate hash value of each section data block.

The second cluster classification module 605 may be configured to compare the hash values of the section data blocks for the virus files, and to classify virus files of which the hash values of the section data blocks have a specified hash similarity into a secondary category.

The above are just the preferable embodiments of the present disclosure, and the protection scope of the present disclosure is not limited thereto. Variations or alterations, which can be easily made by those skilled in the art within the technical scope disclosed by the present disclosure, should fall within the scope of protection of the present disclosure.

Therefore, the scope of protection of the present disclosure should be defined by the scope of protection of the claims.

Industrial Applicability

The method and the device for cluster classifying virus files according to the present disclosure may be performed by a computer automatically to analyze the binary data of the virus files and perform the classification based on the binary data. Thus, it may be able to enhance the efficiency for the cluster classification of computer virus files, and reduce resource consumption including the consumption for human resources, time resources, computer resources and so on.

Compared with the cluster classification in the prior art in which dynamic running, or execution of the virus files is required, in the present disclosure a static analysis is utilized to compare the binary portable executable (PE) structure data of the virus files or to further perform blocked hash comparison on section data, and then the virus files meeting a specified similarity are classified into the same category. Thus it may be able to avoid the risk of virus infection caused by dynamic running of the virus files.

What is claimed is:

1. A method for cluster classifying virus files, comprising:
    A: statically analyzing, with a processor, binary data of each virus files among virus files which need to be classified, so as to obtain portable executable structure data of the each virus file;
    B: classifying, with the processor, the virus files which need to be classified into categories by comparing the portable executable structure data of the virus files which need to be classified, and classifying virus files with the portable executable structure data meeting a specified similarity condition into a particular category; and
    C: performing, with the processor, a secondary cluster classification on categorized virus files in each of the categories classified in step B, wherein for the categorized virus files in the particular category classified in the step B, the secondary cluster classification comprises:
        C1: statically analyzing binary data of each of the categorized virus files to obtain section data of each categorized virus file;
        C2: performing block-division on the section data of the each categorized virus file to obtain section data blocks of the each categorized virus file, the block-division performed with a same block division mode, and calculating a hash value of each section data block; and
        C3: comparing the hash values of the section data blocks of the categorized virus files, and further classifying the categorized virus files with the hash values of the section data blocks meeting a specified hash similarity into a secondary category.

2. The method according to claim 1, wherein the step B comprises:
    comparing the portable executable structure data of a next virus file from the virus files which need to be classified with the portable executable structure data of a central file of each category of the categories classified in the step B;
        if the PE structure data of the next virus file meets the specified similarity condition with the PE structure data of the central file of the particular category, classifying the next virus file into the particular category; and
        if the PE structure data of the next virus file fails to meet the specified similarity condition with the PE structure data of the central file of any of the categories classified in step B, setting the next virus file as the central file of a new category.

3. The method according to claim 2, wherein the step B further comprises:
    determining whether a number of the categorized virus files in the particular category is within a specified numeric range, and if the number of the categorized virus files is within the specified numeric range, re-determining the central file of the particular category.

4. The method according to claim 3, wherein re-determining the central file of the particular category comprises:
    obtaining similarities between the portable executable structure data of a virus file in the particular category and each respective other virus file in the particular category;
    obtaining a sum of similarity for each virus file in the particular category by adding the obtained similarities of the each virus file; and
    setting the virus file with the maximum sum of similarity as the central file of the particular category.

5. The method according to claim 1, wherein the portable executable structure data comprises a DOS header, a PE header, and a section table information.

6. The method according to claim 1, wherein step C3 comprises:
    comparing the hash values of the section data blocks of a next virus file from the categorized virus files of the particular category with the hash values of the section data blocks of a second central file of each secondary category classified in step C3, and if the hash values of the section data blocks of the next virus file meet the specified hash similarity with the hash values of the section data blocks of the central file of a particular secondary category, classifying the next virus file into the particular secondary category;
    if the hash values of the section data blocks of the next virus file fail to meet the specified hash similarity with the hash values of the section data blocks of the central file of any secondary category classified in step C3, setting the next virus file as the central file of a new secondary category.

7. The method according to claim 6, further comprising:
    determining whether a number of virus files in the particular secondary category is within a specified numeric range, and if the number of the virus files in the particular secondary category is within the specified numeric range, re-determining the central file of the particular secondary category.

8. The method according to claim 7, wherein re-determining the central file of the particular secondary category comprises:
    obtaining similarities between the hash values of the section data blocks of a virus file in the particular secondary category and each respective other virus file in the particular secondary category;
    obtaining a sum of hash similarity for each virus file in the particular secondary category by adding the obtained similarities of the each virus file; and
    setting the virus file with the maximum sum of hash similarity as the central file of the particular secondary category.

9. The method according to claim 1, wherein determining whether the hash values of the section data blocks of the categorized virus files have the specified hash similarity comprises:
    comparing the hash values of corresponding section data blocks for two virus files;

counting number of the section data blocks of the two virus files with identical hash values;

if the number exceeds a specified threshold, determining that the hash values of the section data blocks of the two virus files have the specified hash similarity.

10. A device for cluster classifying virus files, comprising:

a memory coupled to a processor which includes:

a first data analyzing module, configured to statically analyze binary data of virus files which need to be classified to extract portable executable structure data of each of the virus files;

a first cluster classification module, configured to categorize the each of the virus files into clusters based on the portable executable structure data of the respective Virus files which need to be classified wherein, the virus files with the respective portable executable structure data meeting a specified similarity condition are categorized into a cluster;

a second data analysis module, configured to statically analyze binary data of each of the categorized virus files in the cluster to obtain section data of each categorized virus file in the cluster:

a block-division module, configured to perform block-division on the section data of the each categorized virus file in the cluster to obtain section data blocks of the each categorized virus file, and to calculate a hash value of each section data block; and a second cluster classification module, configured to further categorize the categorized virus files in the cluster into secondary clusters based on the hash values of the section data blocks of the respective categorized virus files, wherein, the categorized virus files with the respective hash values of the section data blocks with a specified hash similarity are further categorized into a secondary cluster.

* * * * *